US006961585B2

(12) United States Patent
Minematsu

(10) Patent No.: US 6,961,585 B2
(45) Date of Patent: Nov. 1, 2005

(54) PORTABLE WIRELESS COMMUNICATION APPARATUS WITH THE VARIED HOLD TONE

(75) Inventor: Toru Minematsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 530 days.

(21) Appl. No.: 09/928,866

(22) Filed: Aug. 13, 2001

(65) Prior Publication Data

US 2002/0022500 A1 Feb. 21, 2002

(30) Foreign Application Priority Data

Aug. 15, 2000 (JP) ..................................... P2000-246124

(51) Int. Cl.[7] ................................................ H04M 1/00

(52) U.S. Cl. ................................ 455/556.1; 455/553.1; 455/551; 455/569.1; 455/563; 455/567; 455/407; 455/414.1

(58) Field of Search ........................... 455/556.1, 550.1, 455/553.1, 500, 551, 569.1, 563, 567, 403, 407, 414.1, 556, 414

(56) References Cited

U.S. PATENT DOCUMENTS 5,828,995 A * 10/1998 Satyamurti et al. ........ 358/1.18
6,167,251 A * 12/2000 Segal et al. ................. 455/406
6,216,016 B1 * 4/2001 Cronin ....................... 455/567

* cited by examiner

*Primary Examiner*—Nick Corsaro
*Assistant Examiner*—Shaima Q. Aminzay
(74) *Attorney, Agent, or Firm*—Frommer Lawrence & Haug LLP; William S. Frommer; Thomas F. Presson

(57) ABSTRACT

When a call is on hold due to an operating input from a key input unit, a music signal processing unit plays back music stored in a memory card and transmits it as a holding tone via a audio signal switching unit and a wireless signal processing unit to a party on the other end of the line, so that a portable telephone capable of providing music of high tone quality and superior general quality as the holding tone to the party on the other end of the line placed on hold with no addition of any new device is provided.

2 Claims, 1 Drawing Sheet

PORTABLE WIRELESS COMMUNICATION APPARATUS WITH THE VARIED HOLD TONE

CROSS REFERENCES TO RELATED APPLICATIONS

The present document is based on Japanese Priority Document JP 2000-246124, filed in the Japanese Patent Office on Aug. 15, 2000, the entire contents of which being incorporated herein by reference.

BACKGROUND OF THE INVENTION

1. Field of the Invention

The present invention relates to a portable wireless communication apparatus provided with a diversity of ringing tones, i.e., tones indicating incoming calls, and holding tones, and particularly relates to a portable wireless communication apparatus with a function of music playback which enables prestored music data to be used as the holding tone during a call.

2. Description of the Related Art

Portable telephones available today include models that are designed to use one of harmony melodies stored in memory means as a ringing tone that rings upon receiving a call. In this case, the melodies stored in the memory means can be selected freely from a plurality of tunes prestored at the time of purchase, a plurality of tunes downloaded through communication to the outside, and a plurality of tunes composed by individuals. Herein, a harmony melody means a melody provided with chordal harmonies including a plurality of level tones.

Some portable telephones even go so far as to employ such a harmony melody used as a ringing tone as a holding tone, when holding the line, to be delivered to a party on the other end of the line, and the holding tone itself has an increased freedom of tune selection, with an improvement of its tone quality. Nonetheless, inasmuch as the memory capacity of storing the holding tone has its bounds, limits are set on the number of tunes memorized and the length of a tune, while there are available other portable telephones having an external memory, in which music is stored, functioning as a portable playback system as well.

As described above, conventional portable telephones enable the harmony melodies to serve as the holding tone as well as the ringing tone. Despite considerable improvements made in the selection of tunes and the quality of sound by utilizing the harmony melodies for the holding tone and the ringing tone, there are still problems of limitations imposed on the number of tunes and the length of performance of a tune storable in a built-in memory.

Accordingly, there has been a need for providing, with a relatively simple process of utilizing a tune stored in an eternal memory as a holding tone and/or a ringing tone, a portable telephone which can obviate the aforementioned problems and which can deliver to the party on the other end of the line while on hold, without adding any new special device, music of high tone quality and superior general quality as the holding tone. In addition, there has been another need for providing a portable telephone which can deliver music of high tone quality and superior general quality as the ringing tone, without adding any new special device.

SUMMARY OF THE INVENTION

To the end described above, the present invention provides a portable wireless communication apparatus, in particular, a portable telephone having wireless communication means for wirelessly carrying out transmission/reception of messages with a party on the other end of the line, memory unit connection means for connecting to an external memory unit, music information processing means for reading out and playing back music data stored in the external memory unit being connected via the memory unit connection means, call holding instruction means for instructing to hold a call upon receiving a call, and control means for controlling the aforementioned music information processing means when holding a call while speaking to a terminal on the other end of the line according to the instructions of the aforementioned call holding instruction means and directing the aforementioned wireless communication means so as to transmit music information as a call holding tone to the aforementioned terminal.

This enables the music stored in the external memory unit to operate as the call holding tone, thereby improving the tone quality and the general quality of the call holding tone and furthering diversity thereof.

DETAILED DESCRIPTION OF THE PREFERRED EMBODIMENT

Figure 1:
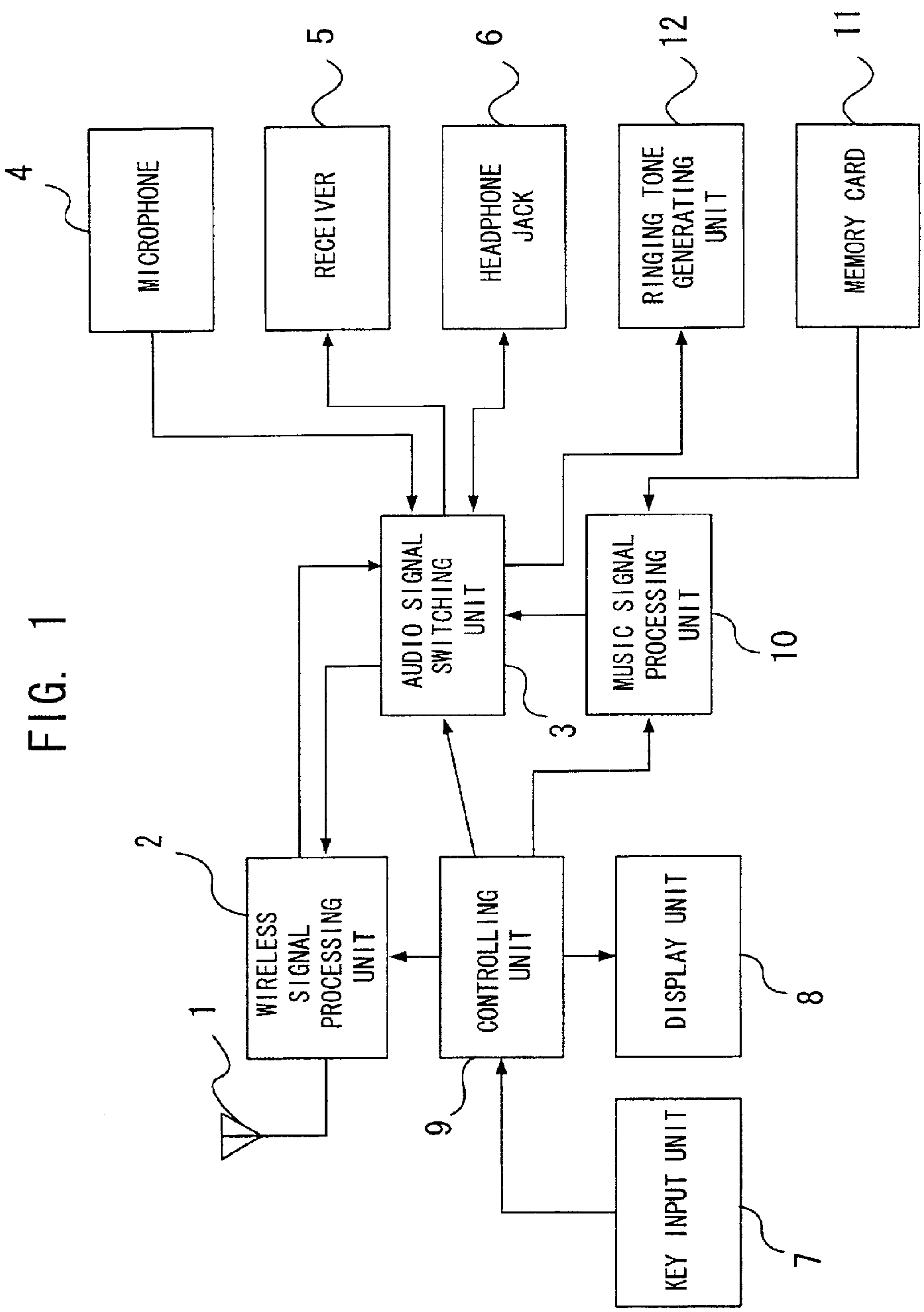
FIG. 1 is a block diagram showing a configuration of a portable telephone according to the present invention.

A portable wireless communication apparatus of a preferred embodiment according to the present invention will be described below in detail with reference to the drawing. In the description, although there will be explained a portable telephone as an example, the present invention is not limited thereto and may be applied any other portable wireless communication apparatuses.

A block diagram in FIG. 1 shows a configuration of the portable telephone of the preferred embodiment according to the present invention.

In FIG. 1, each of the reference numerals indicates as follows: 1: an antenna; 2: a wireless signal processing unit; 3: an audio signal switching unit; 4: a microphone; 5: a receiver; 6: a headphone jack; 7: a key input unit; 8: a display unit; 9: a controlling unit; 10: a music signal processing unit; 11: a memory card serving as an external memory unit; and 12: a ringing tone generating unit.

The antenna 1 transmits and receives radio waves employed for portable telephones. The wireless signal processing unit 2 performs received signal processing by means of decoding received signals from the antenna 1 and carrying out voice decoding, and transmitter signal processing by means of translating inputted audio signals to voice code, modulating it, and transmitting the wireless frequency signals to the antenna 1.

The audio signal switching unit 3 provides a connection or cuts off a connection to the input signals from the wireless signal processing unit 2, the microphone 4, the headphone jack 6, the music signal processing unit 10 or the like with respect to the wireless signal processing unit 2, the receiver 5, and the headphone jack 6, additionally functioning to output, via the ringing tone generating unit 12, ringing tone data, such as a harmony melody, sound, voice and the like, stored in the memory contained in the control unit 9 upon receiving a call.

The microphone 4 converts voice to electric signals, while the receiver 5 converts electric signals to audio signals. The headphone jack 6 is a connection slot for the headphone and the earphone microphone connected to the outside, transmitting and receiving audio signals.

The key input unit 7 comprises a group of switches such as ten keys to be used by the user for giving operating instructions to the terminal.

The display unit 8 shows to the user information from the terminal regarding operating status and other data.

The control unit 9 confirms the user's operation in accordance with the signal received from the key input unit 7, and, according to a request therefrom, controls the operation of the wireless signal processing unit 2, the audio signal switching unit 3, the display unit 8 and the music signal processing unit 10.

The music signal processing unit 10 reads out music data of a tune specified by the external memory 11, converts music data to music signals, and outputs the music signals to the audio signal switching unit 3. Although the playback function of converting music data to music signals is described in this case for the sake of brevity, the music signal processing unit 10 may be endowed with the recording function of converting the music signals to music data and writing it in the external memory unit 11. The external memory unit 11 which is a memory for storage of music data can be connected to the terminal of the portable telephone via connector and is of detachable construction. In this example, a memory card is what is considered as the external memory unit 11, whereas a non-detachable memory for music data to be installed inside the terminal may also be acceptable.

To hear voice of the party on the other end of the line when making a call with the portable telephone according to the present invention, the receiving signals from the antenna 1 are processed at the wireless signal processing unit 2 for conversion to audio signals which are outputted via the audio signal switching unit 3 to the receiver 5. Further, when transmitting the speaker's voice to the party on the other end of the line, voice input from the microphone 4 is delivered via the audio signal switching unit 3 to the wireless signal processing unit 2 where the input is processed, converted to wireless signals, and transmitted from the antenna 1.

The operations of transmitting an outgoing call and receiving an incoming call are performed as the user operates the key input unit 7, whereas the result of each operation is conveyed to the control unit 9 which executes the operation of transmitting an outgoing call or receiving an incoming call by directing the wireless signal processing unit 2 and the audio signal switching unit 3, the status of operation being notified via the display unit 8 to the user. The headphone jack 6 may be used in lieu of the microphone 4 and the receiver 5.

When the portable telephone of this embodiment according to the present invention is used as the portable music playback device based on the external memory unit 11 such as the memory card, the control unit 9 controls the audio signal switching unit 3 and the music signal processing unit 10 in accordance with the user's operation received by the key input unit 7, whereafter the music signal processing unit 10 reads out music data in the external memory unit 11, converting the data to music signals and sending the signals to the audio signal switching unit 3 which outputs the signals to the headphone jack 6 or the receiver 5.

The present invention is characterized by the use of the music data stored in the external memory unit 11 upon operation of the apparatus as a portable telephone.

When the operation of holding is performed by the user with respect to the key input unit 7 while having a call, the control unit 9 directs the audio signal switching unit 3, cutting off the wireless signal processing unit 2 from the microphone 4 and the receiver 5, whereupon the control unit 9 controls the music signal processing unit 10, reads out and plays back the tune preset by the user from the external memory unit 11, further controlling the audio signal switching unit 3 and conveying the music signals to the wireless signal processing unit 2, thereby transmitting the music as the holding tone from the antenna 1.

Likewise, the present invention may be adapted to use the music data stored in the external memory unit 11 as the ringing tone. Upon receiving an incoming call, if the user has made a setting beforehand, the control unit 9 controls the music signal processing unit 10 to play back the tune preset by the user, further controlling the audio signal switching unit 3 to output the played-back music signals via the ringing tone generating unit 12 as the ringing tone.

With no addition of any new device, this makes it possible to provide the party on the other end of the line on hold with a music program of high tone quality, thus diminishing the unpleasantness of waiting time. Further, even if the holding time should extend for a long period of time, there is no repetition of the same melody, thus making the party on the other end of the line not to feel the length of time. Moreover, it is possible to provide even more diversity to the ringing tone so that music programs of high tone quality may serve as the ringing tone.

As described above, according to the present invention, it is possible to realize a portable telephone which can provide music of high tone quality and superior general quality as the holding tone to the party on the other end of the line on hold as well as the ringing tone without adding any new device.

What is claimed is:

1. A portable wireless communication apparatus, comprising:

wireless communication means for a first party to wirelessly communicate with a second party;

memory unit connection means for connecting the portable wireless communication apparatus to an external memory unit;

music information processing means for reading out and playing back music data stored in said external memory unit being connected via the memory unit connection means;

call holding instruction means for instructing to hold a call upon receiving a call; and control means for controlling said music information processing means when holding a call according to instructions from said call holding instruction means by virtue of directing said wireless communication means so as to play back pre-selected music information stored in said external memory unit and controlling said wireless communication means to transmit the music information as a call holding tone such that the music information is non-repetitive.

wherein the pre-selected music information is used as a ring tone of the portable wireless communication apparatus.

2. The portable wireless communication apparatus according to claim 1, wherein said external memory unit is a memory card.

* * * * *